United States Patent
Hielscher et al.

(10) Patent No.: US 9,724,781 B2
(45) Date of Patent: Aug. 8, 2017

(54) SONOTRODE AND DEVICE FOR GENERATING LOW FREQUENCY POWER ULTRASOUND

(71) Applicant: Dr. Hielscher GmbH, Teltow (DE)

(72) Inventors: Thomas Hielscher, Potsdam (DE); Harald Hielscher, Stahnsdorf (DE); Holger Hielscher, Teltow (DE)

(73) Assignee: Dr. Hielscher GMBH, Teltow (DE)

( * ) Notice: Subject to any disclaimer, the term of this patent is extended or adjusted under 35 U.S.C. 154(b) by 204 days.

(21) Appl. No.: 14/677,344

(22) Filed: Apr. 2, 2015

(65) Prior Publication Data

US 2015/0314391 A1 Nov. 5, 2015

Related U.S. Application Data

(60) Provisional application No. 61/975,394, filed on Apr. 4, 2014.

(51) Int. Cl.
*B23K 20/10* (2006.01)
*B06B 3/02* (2006.01)

(52) U.S. Cl.
CPC .............. *B23K 20/106* (2013.01); *B06B 3/02* (2013.01)

(58) Field of Classification Search
CPC ................................ B06B 3/02; B23K 20/106
See application file for complete search history.

(56) References Cited

U.S. PATENT DOCUMENTS

| | | | | |
|---|---|---|---|---|
| 9,011,698 B2* | 4/2015 | Hielscher | ............... | B01J 19/008 310/321 |
| 2008/0251375 A1* | 10/2008 | Hielscher | ............... | B01J 19/008 204/157.42 |
| 2010/0320257 A1* | 12/2010 | Buttiker | ................. | B23K 20/10 228/110.1 |
| 2014/0051035 A1* | 2/2014 | Stoffel | ...................... | B06B 3/00 367/137 |
| 2014/0157899 A1* | 6/2014 | Jurzitza | .................. | G01H 11/06 73/579 |
| 2015/0314391 A1* | 11/2015 | Hielscher | .................. | B06B 3/02 367/137 |

FOREIGN PATENT DOCUMENTS

DE 102015105038 A1 * 10/2015 ........... B23K 20/106

* cited by examiner

*Primary Examiner* — Daniel Pihulic
(74) *Attorney, Agent, or Firm* — Fox Rothschild LLP; Robert J. Sacco; Carol E. Thorstad-Forsyth

(57) ABSTRACT

The invention relates to a sonotrode (1) for an apparatus (40) for generating low-frequency high-power ultrasound. To be able to manufacture and permanently operate the sonotrode even with elements (2, 3) made of brittle materials, the sonotrode (1) is constructed with at least two materially interconnected elements (2, 3).

11 Claims, 8 Drawing Sheets

Figure 6:
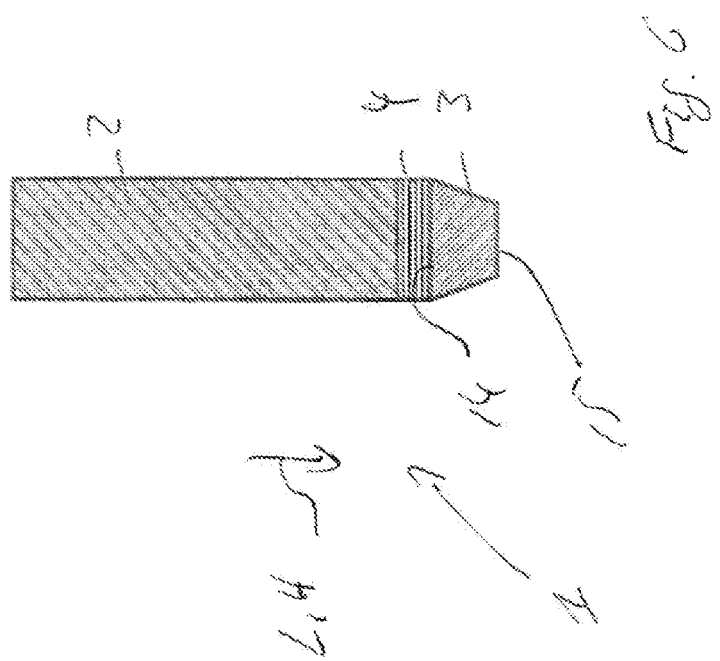

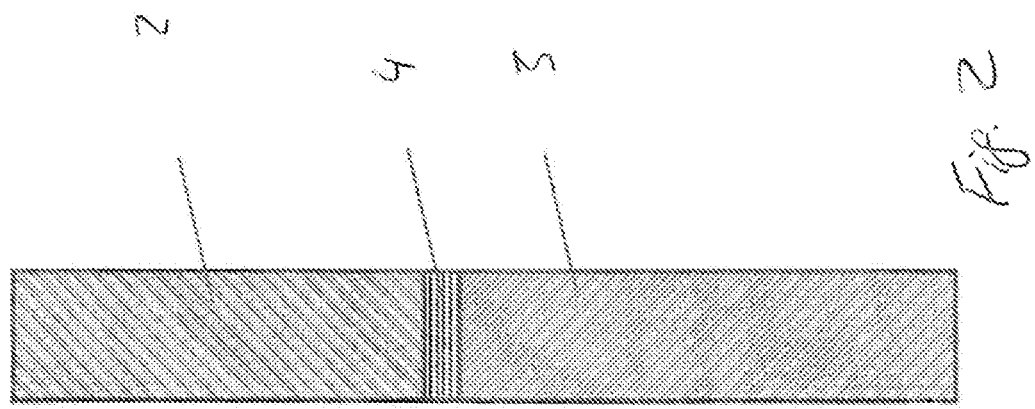
Fig. 2
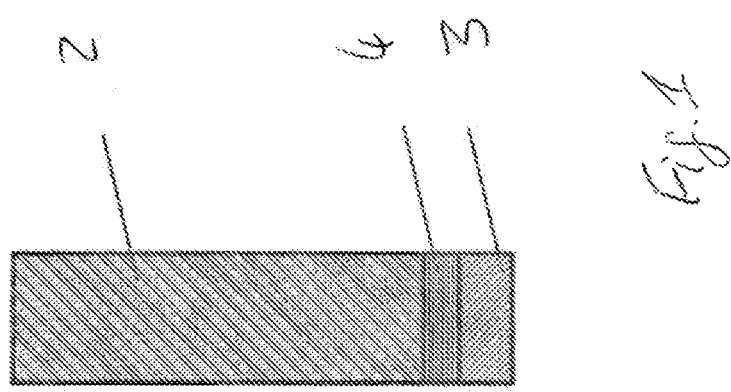
Fig. 1
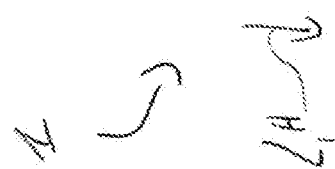

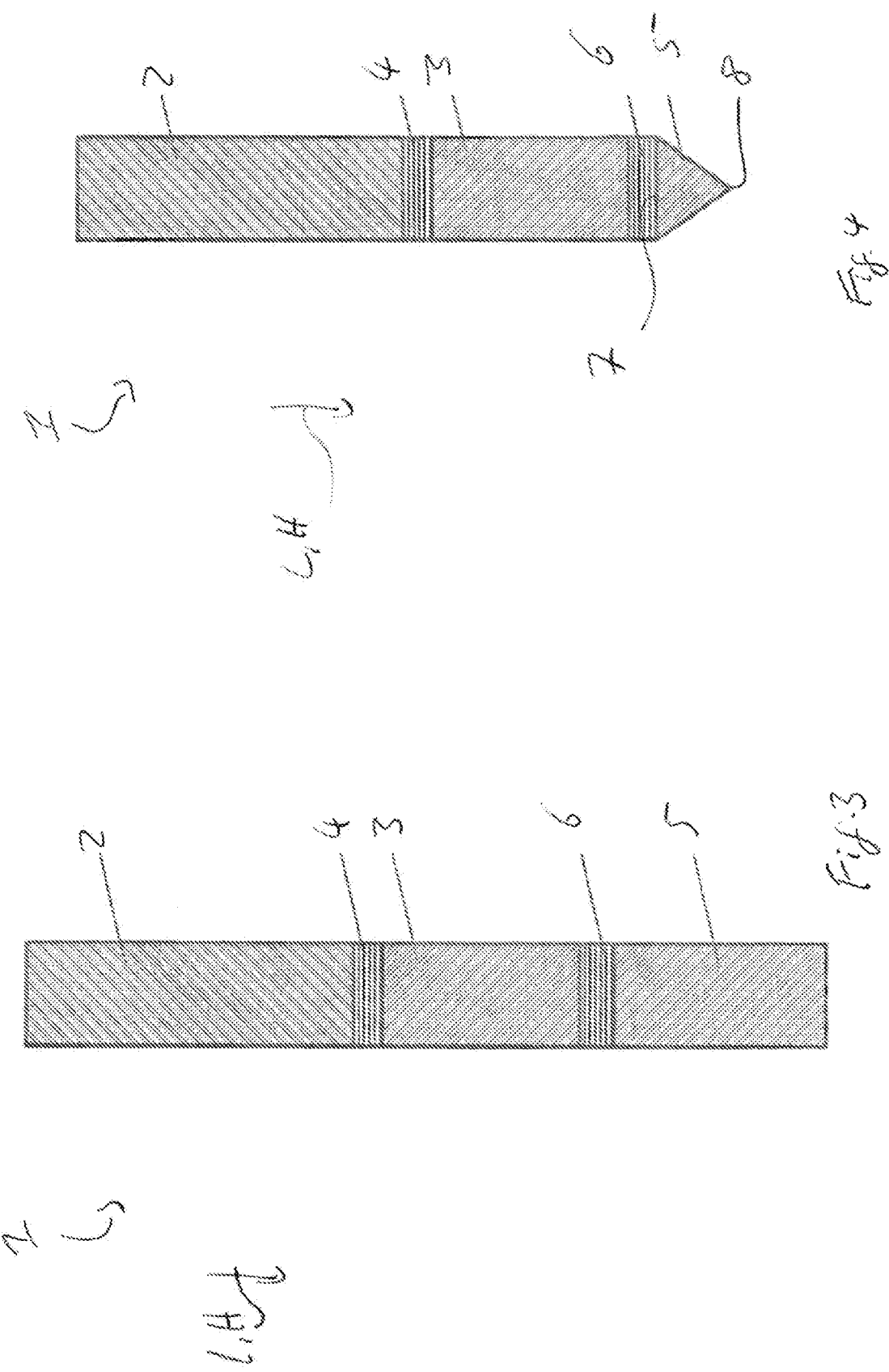

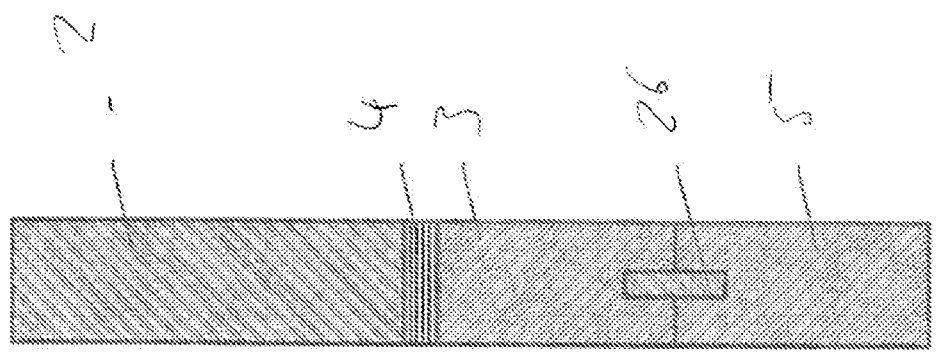
Fig. 10
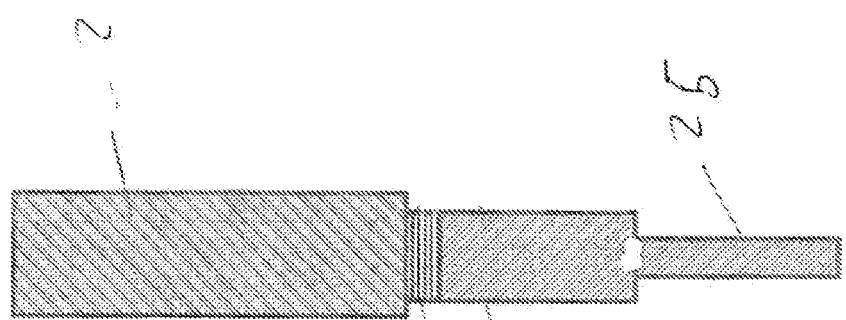
Fig. 9

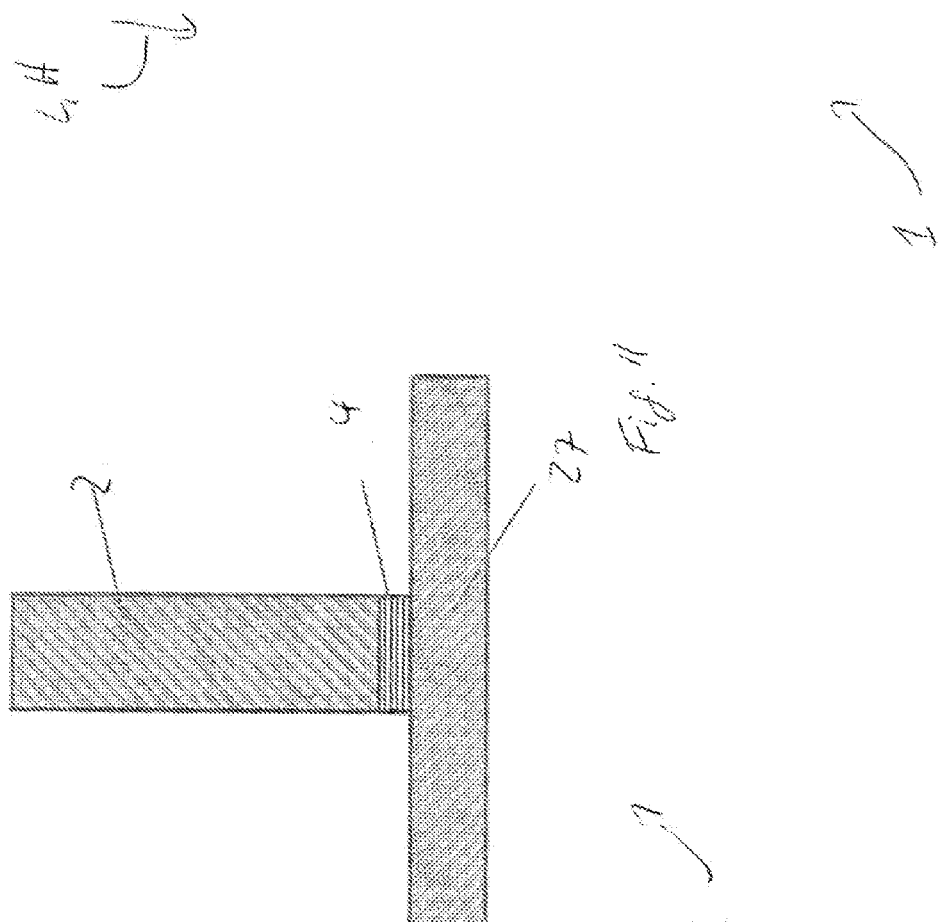

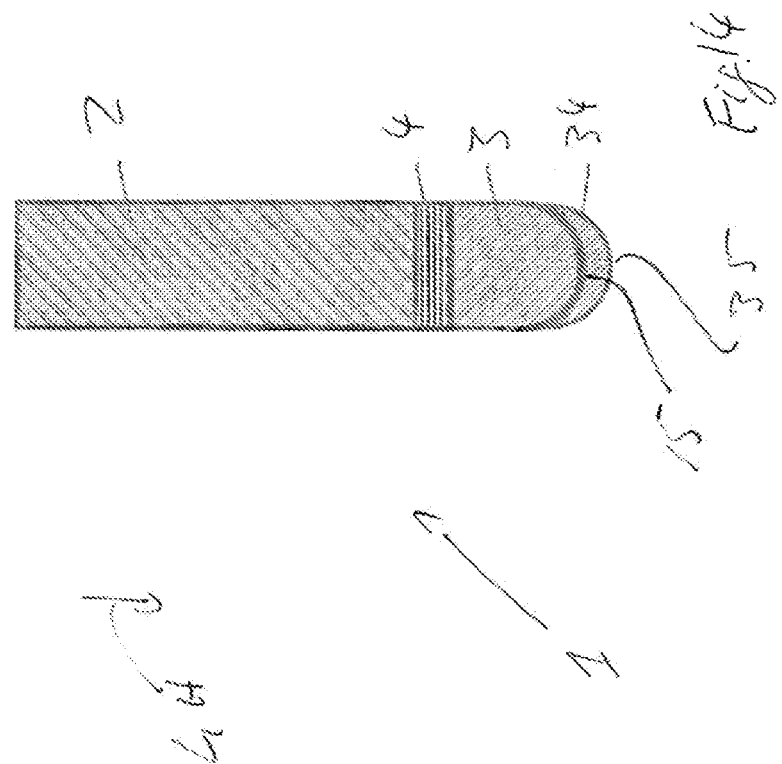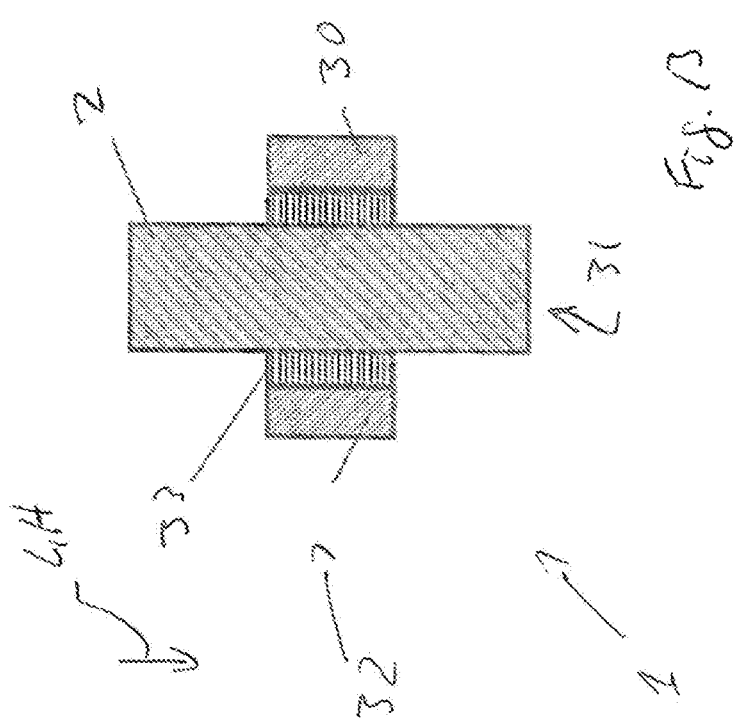

SONOTRODE AND DEVICE FOR GENERATING LOW FREQUENCY POWER ULTRASOUND

CROSS-REFERENCE TO RELATED APPLICATIONS

This application claims priority to and the benefit of U.S. Provisional Application No. 61/975,394 filed Apr. 4, 2014, the entirety of which is hereby incorporated by reference.

The invention relates to a sonotrode for transmitting low-frequency high-power ultrasound, and an apparatus for generating low-frequency high-power ultrasound, wherein the sonotrode has multiple elements. The invention also relates to an apparatus for generating low-frequency high-power with a sonotrode.

In conventional sonotrodes, the elements are positively or non-positively interconnected. However, the selection of interconnectable materials is disadvantageously limited when using positive and non-positive connections. For example, screw connections in brittle materials are frequently not able to withstand mechanical loads, especially tensile loads since, for example, threads break in the brittle material under mechanical load. However, in particular the non-positive screw connection itself produces a mechanical tensile load that can burden brittle materials. At the latest in operation, i.e. when the sonotrode is supposed to transmit low-frequency high-power ultrasound, non-positive screw connections of brittle elements fail under their own tensile load and the low-frequency high-power ultrasonic oscillations.

It is therefore the object of the invention to provide a sonotrode and an apparatus for generating low-frequency high-power ultrasound wherein elements of the sonotrode can be permanently attached to each other and the sonotrode can be operated continuously, even when at least one of the elements of is made of a brittle material.

The object is attained for the above-mentioned sonotrode in that at least two of several elements are materially connected to each other. The object is attained for the above-mentioned apparatus in that the sonotrode is a sonotrode according to the present invention.

Due to the material connection of at least two of the plurality of elements to each other, none of the materially interconnected elements requires structures formed thereon, for example a thread, for attachment of the elements to each other, which break under mechanical load due to the brittleness of the material of the element.

Furthermore, the two elements can be designed to be simpler and use less material, since they do not need to be formed with connecting structures to fasten the two elements together, such as internally threaded bores or pins having external threads.

Moreover, the material connection between the two elements has a higher tensile strength than the screw connection of one of the two elements made of a brittle material with the other of the two elements.

The inventive solution can be further improved by various embodiments which have separate advantages and can be combined, unless stated otherwise, in any desired configuration. These embodiments and their associated advantages will be discussed below.

For example, one of the materially interconnected elements may be made of a different material from another one of the materially interconnected elements. The material of one of the materially interconnected elements may, for example, be selected so as to withstand a fluid provided to introduce ultrasound into the element. The fluid may be, for example, a chemically reactive or hot fluid, for example a melt. For example, for reasons of cost, the other of the materially interconnected elements may be made of a different material that may not be able to withstand the fluid and would melt, for example, when in direct contact with the melt.

At least one of the materially interconnected elements may be made of a glass or a ceramic material or may even consist of the glass or the ceramic material. In particular, a base body of this element may be made of the glass or the ceramic material and optionally be provided with a bonding layer. The bonding layer may be arranged at a connecting surface of the element to produce the material bond. Alternatively, the ceramic material itself may be configured to enable the production of the adhesive bond. In particular, the ceramic material may be solderable and optionally may have a metal proportion. If one of the two elements is made of a glass material, for example quartz glass, it can be materially bonded to the other of the two members by using glass solder.

Preferably, at least one of the materially interconnected elements is a lambda/2 element. For example, both or even all of the plurality of elements may be lambda/2 elements.

At least one of the materially interconnected elements may be formed as a hollow body. In particular, the element that is to be brought into contact with a material for the introduction of ultrasound into this material may be such a hollow body. The material may be filled, for example, in the element constructed as a hollow body for exposure to ultrasound.

At least one of the materially interconnected elements may be a cylindrical body, for example, a hollow cylindrical body. Cylindrical or hollow cylindrical body can be more easily produced than free-form bodies.

In particular, at least one of materially interconnected elements and, in particular the element designed to introduce the ultrasound into the material, may be a pipe segment. Pipe segments can be particularly easily manufactured, with their length being readily adaptable to a required length for introducing the ultrasound.

At least one of the materially interconnected elements and in particular the element which is to be brought into contact with the material to be sonicated for sonication may be formed so that a fluid can flow therethrough. The fluid may be treated with ultrasound, while the fluid flows through the flow-through element. In this way, larger amounts of fluid can be easily sonicated without requiring the fluid to be batch-fed to the element. Alternatively, the fluid may be a coolant, such as an inert gas or a liquid.

The sonotrode may be designed with a predetermined main propagation direction for low-frequency high-power ultrasound. For example, the main propagation direction may extend along a longitudinal direction of the sonotrode, which may for example be cylindrical. Preferably, the at least two of the plurality of materially interconnected elements each have a connecting surface. The connecting surfaces of the two elements face each other in the interconnected state of the elements and materially interconnect the elements, for example with a connecting section of the sonotrode. The connecting surfaces may be formed by applied layers, for example a metallic layer. At least one of the connecting surfaces may be at least partially or even completely aligned perpendicularly to the main propagation direction. Along and counter to the main propagation direction, the materially interconnected elements, or their connecting surfaces, may delimit the connecting section. In this way, the connecting section may also be at least partially or even completely aligned perpendicular to the main propagation direction. The ultrasound passing through the resonator is not rendered inhomogeneous transversely to the main propagation direction by the connecting surface extending perpendicular to the main propagation direction.

At least one of the interconnecting surfaces can be designed in the shape of a ring or a hollow cylinder. This reduces the total area of the materially interconnected surfaces in comparison with a disk-shaped connecting surface. In particular, when transmitting low-frequency high-power ultrasonic oscillations to flowable media, for example, a melt of a metal alloy, the connecting surface area between the materially interconnected elements should advantageously be minimized. For example, smaller connecting surfaces conduct heat less efficiently than larger connecting surfaces, so that for example the high temperatures of the melt of the metal alloy to be sonicated have a lesser effect on elements of the sonotrode spaced from the melt.

Ring-shaped or annular connecting surfaces may for example be arranged perpendicular to the main propagation direction, i.e. in a plane extending perpendicular to the main propagation direction. Connecting surfaces shaped as hollow cylinders may be perpendicular or alternatively parallel to the main propagation direction. In particular, outer surfaces and/or a longitudinal axis of the hollow-cylindrical connecting surfaces may extend parallel to the main propagation direction. In this way, the structure of the resonator can be flexibly adapted to its use.

The apparatus may generate during operation low-frequency high-power ultrasound (NFLUS) as a standing wave in the sonotrode. The connecting surface is preferably spaced from an oscillation node and is arranged, for example, in the region of an oscillation maximum, especially at the oscillation maximum.

For a material interconnection of the elements, the elements may be glued together, soldered or welded. Elements made of a non-metallic material may be provided with a metallic layer to facilitate a material interconnection with the respective other element and soldering with, for example, a metal solder.

The sonotrode for transmitting low-frequency high-power ultrasonic oscillations (NFLUS oscillations) to a flowable medium or a solid therefore has at least two materially interconnected elements that can be referred to as pieces of material.

A flowable medium may be a liquid, a condensate, a melt, a solution, an emulsion, a dispersion or a suspension, a mixture, a supercritical fluid, a crystallizing melt or a fluid, preferably a liquid or a melt. Flowable media may have different viscosities from 0 cP (0 Ns/m$^2$) to $3*10^{10}$ cP ($3*10^{11}$ Ns/m$^2$), preferably between 0.1 cP (1 Ns/m$^2$) to $1*10^6$ cP ($1*10^7$ Ns/m$^2$).

The sonotrode may be designed to transmit NFLUS-oscillations to a flowable medium or a solid at any temperature, preferably at temperatures of 400-1100 K, e.g. at 1000K.

A lower pressure (vacuum) is between vacuum (0 bar absolute) and ambient pressure (e.g. 1 bar absolute), for example at 0.5 bar. A higher pressure (positive pressure) is present when the pressure is above the ambient pressure and for example 1.5 bar.

The sonotrode may be designed to transmit NFLUS oscillations into flowable media in a non-atmospheric environment, for example in sealed containers, for example a reactor, under pressures different from ambient atmospheric pressure, for example at a lower pressure, in vacuum or at elevated pressures and in the presence of special ambient gases, for example argon or other inert gases, or in particularly under dry or wet, or cold or hot ambient conditions.

In order to introduce NFLUS into such a container or in a vessel, i.e. the reactor, oscillations can be excited either in the container wall or the vessel wall by an externally mounted NFLUS system, or a NFLUS transducers may be completely installed in a potentially pressurized interior space of the container or vessel. Alternatively, for example, the NFLUS exciter or generator, for example a piezoelectric linear transducer, may be located outside the vessel or container and the oscillations may be transmitted into the interior space of the vessel or container by way of one or more sonotrodes or sonotrode elements.

Soldering is a thermal process for the materially joining pieces of material, wherein a liquid phase is formed by melting a solder (melt soldering) or by diffusion at the interfaces (diffusion soldering). The liquidus temperature of the base materials of the pieces of material is not reached. In the soldering process, the chemical bond is the same, but the nature of the chemical composition of the compound differs. A material connection is established after solidification of the solder. The joining material is usually a readily fusible metal alloy, namely the solder. Ceramic and glass components may be joined with glass solder or with metal solder and metal parts—provided they have been previously metallized. A characteristic feature of a solder joint is the intermetallic compound. In this thin layer, the base material and the solder form an alloy and produce a solid joint.

Welding is the permanent connection of components by applying heat and/or pressure, with or without welding filler materials. In fusion welding, the materials to be joined are heated until they liquefy and intermix, producing a solid joint after solidification. The liquidus temperature of the pieces of material to be joined is reached during welding.

The main propagation direction of the transmitted low-frequency high-power ultrasonic oscillations (NFLUS oscillations) may extend, for example, along the longitudinal axis of the sonotrode.

Low-frequency high-power ultrasound (NFLUS) is ultrasound at an operating frequency of 15 to 200 kHz, preferably 15 to 60 kHz, for example, 20 kHz, and a sound power exceeding 10 W, preferably 100 W to 20,000 W, for example 1000 W. For example, piezo-ceramic or magnetostrictive systems are used to generate the ultrasound. Linear transducers and flat or curved plate transducers or tube resonators as ultrasonic generators are known in the art. Low-frequency high-power ultrasound is used, inter alia, in the treatment of liquids, such as dispersions, emulsions, paints and nanomaterials. For this purpose, ultrasound is transmitted in liquids via the sonotrode, for example, with amplitudes ranging from 1 μm to 350 μm, preferably 10 μm to 80 μm, for example 35 μm.

Lambda is the wavelength of the ultrasound in the sonotrode, which results from the NFLUS frequency and the sound propagation speed in the sonotrode. A high frequency oscillating system may consist of one or more lambda/2 elements. A high frequency oscillating system consisting of several lambda/2 elements may constructed of a piece of material having a corresponding length or may be composed of several materially interconnected elements having a length of n*lambda/2 (n is a natural number). Lambda/2 elements may have different cross-sectional geometries, for example circular, oval or rectangular cross-sections. The cross-sectional geometry and area may vary along the longitudinal axis of a lambda/2 element. The cross-sectional area may be between 0.01 cm$^2$ and 300 cm$^2$, preferably between 10 cm$^2$ and 40 cm$^2$, for example 9 cm$^2$. Lambda/2 elements may be made, inter alia, of metallic or ceramic materials or glass, in particular of titanium, titanium alloys, steel and steel alloys, aluminum or aluminum alloys, for example of titanium grade 5. A lambda/2-element may be made of a piece of material having a corresponding length or may be composed of a plurality of interconnected pieces of material or elements.

In particular, when transmitting NFLUS-oscillations to flowable media, for example a melt of a metal alloy, the contact area between the materially connected pieces of material may advantageously be kept as small as possible. This can be achieved, for example, with an annular solder joint, in particular when a piece of material, for example, the piece of material in contact with the flowable medium, is a hollow body having a round cross-sectional geometry. Furthermore, the piece of material in contact with the flowable medium may in an advantageous embodiment be made of a ceramic material with high thermal conductivity. To prevent the solder from melting during operation, a ceramic piece of material having a length of more than 100 mm, preferably 200 to 1500 mm, for example 550 mm, is advantageous. A temperature-controlled fluid, such as an inert gas, may pass through or flow around the piece of material in contact with the flowable medium in order to significantly reduce the heat transfer from the flowable medium to the solder joint.

Such a sonotrode is suitable to transmit to a flowable medium or a solid the NFLUS-oscillations that are transmitted by a NFLUS-exciter or -generator to the sonotrode.

When using a hollow-body piece of material, NFLUS transmission is also possible to a flowable medium that at least partially flows through the hollow body.

In all advantageous embodiments, the last element in the longitudinal direction of the sonotrode may be formed from the same or a different material as any of the other elements of the sonotrode. In particular, the last element in the longitudinal direction may be made of a ceramic material or even have a base body made of the ceramic material. The material connection may be prepared, in particular when the material connection is provided by a solder joint or a welded joint, by applying on the last element a metallic layer that becomes part of the material connection.

Embodiments of the invention will now be described with reference to the drawings. The different features of the embodiments may be combined independent of one another, as has already been stated for the individual advantageous configurations.

Figure 15:
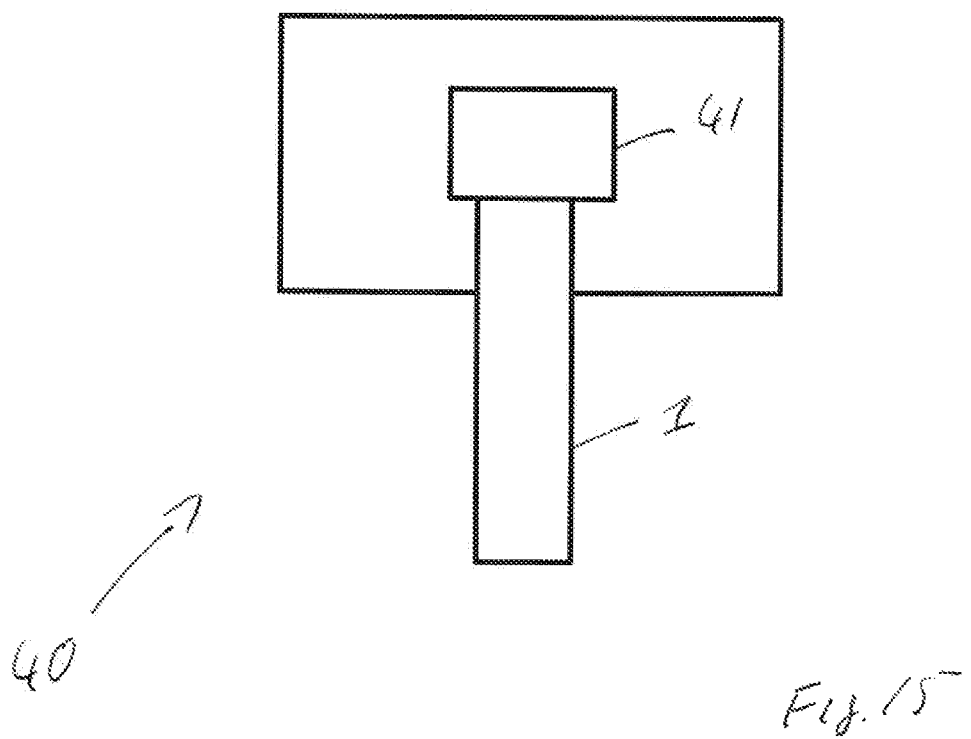

The drawings show in:

FIGS. 1-14 schematic diagrams of exemplary embodiments of the sonotrode according to the invention, and FIG. 15 a schematic diagram of an exemplary embodiment of an apparatus according to the invention for generating low-frequency high-power ultrasound.

The structure and function of a sonotrode according to the invention will first be described with reference to the exemplary embodiment of FIG. 1.

FIG. 1 shows a sonotrode 1 is a schematic sectional view and with two elements 2, 3. The two elements 2, 3 can each be formed as a piece of material. For example, the element 2 is cylindrical or rod-shaped and extends along a longitudinal direction L of the sonotrode 1. In the longitudinal direction L, along which the sectional view of the sonotrode 1 is taken, the element 3 is arranged behind the element 2. A connecting section 4 of the sonotrode is arranged between the elements 2, 3. The elements 2, 3 are solidly bonded to each other in the connecting section 4. For example, the connecting section 4 is formed as a solder layer, and the elements 2, 3 are soldered to each other. Alternatively, the connecting section 4 may be formed as a welding layer or as an adhesive layer that fastens the elements 2, 3 to each other.

The element 2 is shown by way of example to be larger in the longitudinal direction L than the element 3. The sonotrode 1 may be aligned such that a main propagation direction H of ultrasound extends through the sonotrode 1 along the longitudinal direction L. Such a sonotrode 1 is thus, for example, a longitudinally oscillating sonotrode 1.

FIG. 2 shows schematically another exemplary embodiment of the sonotrode 1 according to the invention in a side view sectioned along the longitudinal direction L. The same reference symbols are used for elements that correspond in their function and/or structure to the elements of the exemplary embodiment of FIG. 1. For sake of brevity, only the differences from the exemplary embodiment of FIG. 1 will be discussed below.

In the embodiment of FIG. 2, the element 3 is larger in the longitudinal direction L than the element 2. The element 3 is also cylindrical and, for example, rod-shaped.

FIG. 3 shows schematically another exemplary embodiment of the sonotrode 1 according to the invention in a side view sectioned along the longitudinal direction L. The same reference symbols are used for elements that correspond in function and/or construction to the elements of the embodiments of FIG. 1 or 2. For sake of brevity, only the differences from the exemplary embodiments of FIGS. 1 and 2 are discussed here.

The element 3 is shorter than the element 2 along the longitudinal direction L, but longer than the element 3 of the exemplary embodiment of FIG. 1. In addition, in the exemplary embodiment of FIG. 3, an additional element 5 is arranged in the longitudinal direction L behind the element 3. The additional element 5 is materially connected to the element 3 by way of another connecting section 6. The connecting section 6 may also be a solder layer or an adhesive layer or a welded section fastening the elements 3 and 5 together. The element 5 is, like the elements 2, 3, cylindrical and, for example, rod-shaped.

FIG. 4 shows schematically another exemplary embodiment of the sonotrode according to the invention of FIG. 1 in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 3 are discussed here.

The additional element 5 in the exemplary embodiment of FIG. 4 is shown as having a triangular cross-section. The shape of the triangular cross-section can correspond to an isosceles or an equilateral triangle. For example, the additional connecting element 5 of the exemplary embodiment of FIG. 4 is constructed as a cylinder with a triangular base, with this cylinder extending transversely to the longitudinal direction L. Alternatively, the additional element can be designed as a pyramid 5.

A flat side 7 of the additional element 5 is materially connected with the element 3 of the sonotrode 1 via the connecting section 6. An apex 8 or edge 8 of the additional element 5 points away in the longitudinal direction L and from the other connecting section 6.

Figure 5:
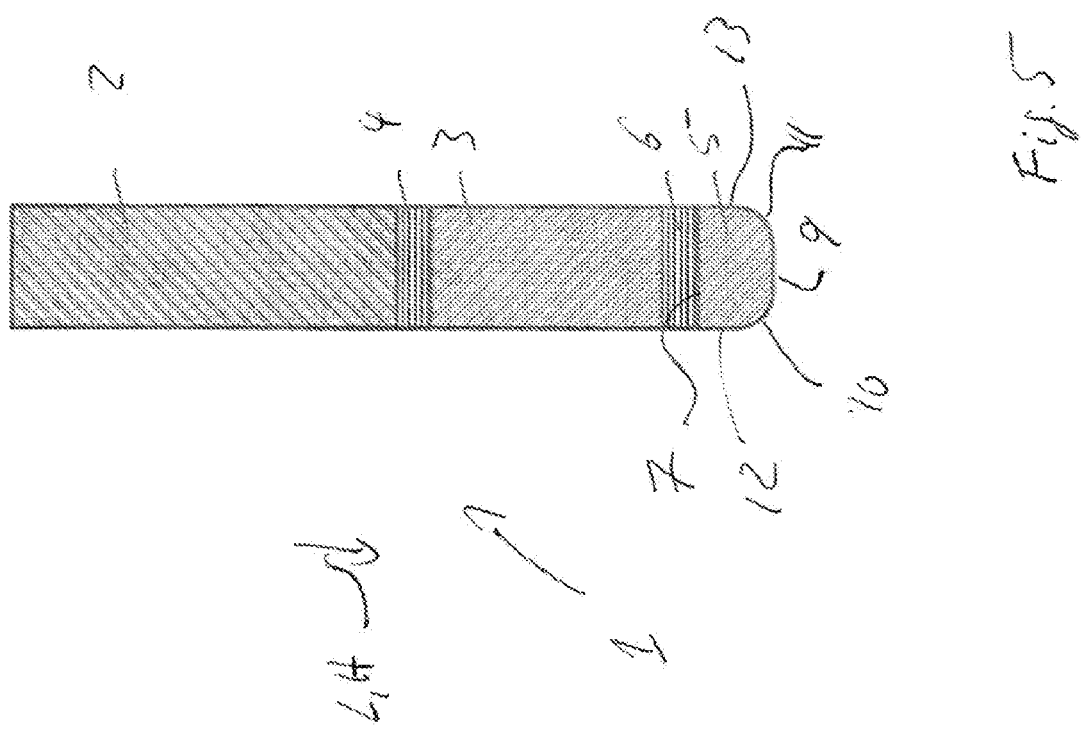

FIG. 5 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 5 are discussed in the following.

A side 9 of the additional element 5 facing away from the other connecting section 6 is flat and extends preferably transversely to the longitudinal direction L. Transition regions 10, 11, where the side 9 transitions into lateral sides 12, 13 of the sonotrode 1 extending parallel to the longitudinal direction L and in particular of the additional element 5, are chamfered or rounded off.

The chamfered or rounded transition regions 10, 11 prevent edges of the side 9 disposed transverse to the longitudinal direction L from projecting beyond a center of the side 9 in the longitudinal direction L and generating an undesirably high pressure on a body against which the side 9 is pressed along the longitudinal direction L.

FIG. 6 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 1 are discussed here.

The element 3 of the exemplary embodiment of FIG. 6 is formed with a tapered cross-section in the longitudinal direction L. A side 14 of the element 3 facing the element 2 is larger transversely to the longitudinal direction L than a side 15 of the element 3 facing away from the element 1. The sides 14, 15 extend preferably transversely to the longitudinal direction L.

For example, the cross-section of the element 3 of the exemplary embodiment of FIG. 6 has a trapezoidal shape, in particular an isosceles and/or symmetric trapezoidal shape. The element 3 of the exemplary embodiment of FIG. 6 is formed, for example, as a truncated cone.

Figure 7:
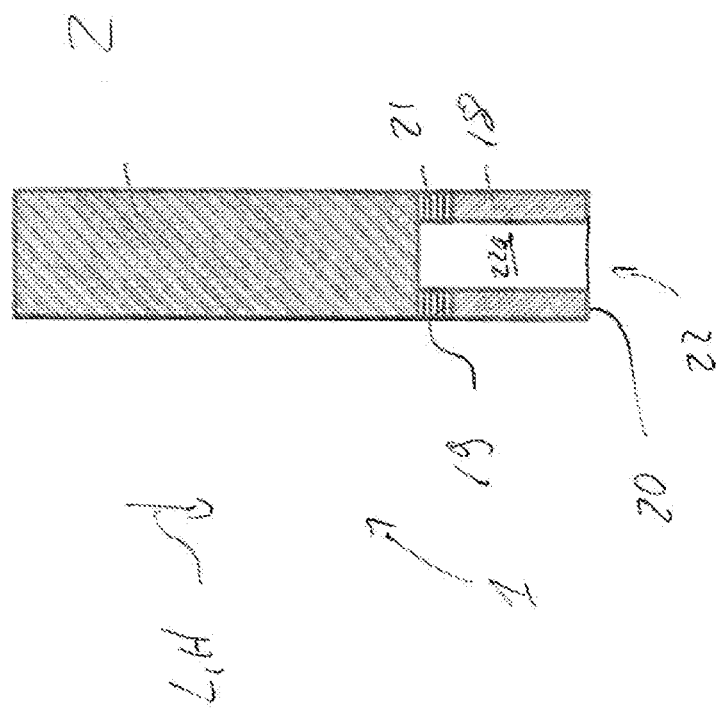

FIG. 7 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 6 are discussed here.

The side 15 of the element 3 of the exemplary embodiment of FIG. 7 facing away from the element 2 is semicircular in the cross-sectional view of FIG. 7. Lateral sides 16, 17 of the element 3 extending parallel to the longitudinal direction L can thus transition seamlessly or without an edge 8 into the round side 17. The side 15 of the element 3 is thus, for example, hemispherical.

Figure 8:
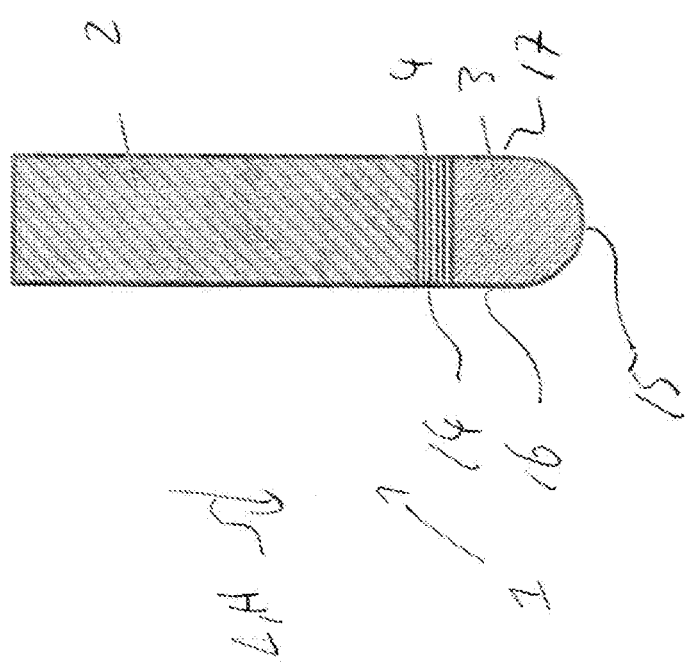

FIG. 8 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 1 are discussed here.

In the exemplary embodiment of FIG. 8, the element 3 of the sonotrode 1 of FIG. 1 is replaced by an element 18. The element 18 is designed as a hollow cylinder and for example as a pipe section, with a longitudinal axis of the element 18 extending parallel to the longitudinal direction L. End faces 19, 20 of element 18 are preferably oriented perpendicular to the longitudinal direction L. The end face 20 faces away from the element 2. The end face 19 faces the element 2 and is materially connected thereto. To materially connect the end face 19 with the element 2, the sonotrode 1 of the exemplary embodiment of FIG. 8 has an annular connecting section 21, whose cross-section transversely to the longitudinal direction L substantially corresponds to the cross-section perpendicular to the longitudinal direction L of the element 18.

The element 18 has in the longitudinal direction L an opening 22, through which material to be sonicated can be introduced into the element 18 opposite to the longitudinal direction L.

Alternatively or in addition, an opening 22a may continuously extend through the element 18 transversely to the longitudinal direction L, so that a fluid, such as a coolant fluid, can flow through the element 18 transversely to the longitudinal direction L. The opening 22a may abut the connecting section 21 and extend in the longitudinal direction L through the entire element 18.

FIG. 9 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 3 are discussed here.

Instead of the element 3 of the exemplary embodiment of FIG. 3, the sonotrode 1 of the exemplary embodiment of FIG. 9 has an element 23, whose cross-section transversely to the longitudinal direction L is smaller than the cross-section of the element 2 transversely to the longitudinal direction L. For example, the element 23 may have a smaller width transversely to the longitudinal direction L than the element 2.

Likewise, a connecting section 24 materially interconnecting the elements 2 and 23 may have a smaller width transversely to the longitudinal direction L than the element 2. In particular, the widths of the element 23 and the connecting section 24 transversely to the longitudinal direction may be substantially identical.

However, the element 23 may have at least along particular sections a constant width along the longitudinal direction L and may be shaped, for example, rod, i.e. a straight cylinder.

However, the width of the element 23 may be abruptly reduced along its course in the longitudinal direction L and away from the element 2, so that an end section 25 of the element 23 transversely to the longitudinal direction L has a smaller width than a rest of the element 23 arranged between the end section 25 and the connecting section 24. The end section 25 can, like the rest of the element 23, be formed straight and, for example, rod-shaped or as a straight cylinder. The length of the end section 25 along the longitudinal direction L may substantially be half of the total length of the element 23.

FIG. 10 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 3 are discussed here.

In the exemplary embodiment of FIG. 10, the elements 3, 5 are not materially interconnected by the additional connecting section 6. Instead, a pin or bolt 26 is provided, which affixes the elements 3 and 5 to each other. The bolt 26 may be a threaded bolt with an external thread. This threaded bolt can be screwed into holes provided with inner threads of the two elements 3, 5, and interconnect the elements 3 and 5 by a screw connection, i.e. a non-positive connection. Alternatively, the pin 26 may be a dowel pin, which may be pressed into openings of the two elements 3, 5 lacking an internal thread so as to non-positively interconnect the elements 3 and 5. The opposing end faces of the two elements 3, 5 may be pressed together by the non-positive connection to allow ultrasound to be exchanged between the two elements 3, 5.

FIG. 11 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 1 are discussed here.

Instead of the element 3 of the sonotrode 1 of the exemplary embodiment of FIG. 1, the sonotrode 1 of the exemplary embodiment of FIG. 11 has an element 27 that is significantly larger transversely to the longitudinal direction L than the element 2. For example, the element 27 may be multiple times or several times larger, for example four times larger, transversely to the longitudinal direction L than the element 2.

The connecting section 4 has transversely to the longitudinal direction L a width that preferably corresponds to the width of the element 2 transversely to the longitudinal direction L. The connecting section 4 may contact the element 27 transversely to the longitudinal direction L at the center and may be materially connected to the element 2.

The element 27 is thin in the longitudinal direction L and may, for example, be note-shaped or leaf-shaped. A note-shaped element 27 may have a rectangular shape in a plane extending transversely to the longitudinal direction L.

FIG. 12 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 10 are discussed here.

An additional element 28, which is shorter along the longitudinal direction L than the additional element 5, is arranged along the longitudinal direction L behind the additional element 5. For example, the length of the element 28 may correspond to a fraction, for example one fifth, of the length of the other element 5.

The other elements 5, 28 are preferably materially interconnected by way of an additional connecting section 29, wherein the additional connecting section 29 is arranged between the other elements 5, 28 along the longitudinal direction L.

FIG. 13 shows schematically another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 1 are discussed here.

In the exemplary embodiment of the FIG. 13, an element 30 of the sonotrode 1 is not materially connected with an end section 31 of the element 2 pointing in the longitudinal direction L. Instead, the element 30 is materially connected with a central section 32 of the element 2. The central section 32 is arranged substantially at the center of the element 2 along the longitudinal direction L.

For example, the element 30 may be ring-shaped, toroidal or be formed as a pipe section, i.e. as a hollow cylinder, and have an inner diameter transversely to the longitudinal direction L that is greater than the outer diameter transversely to the longitudinal direction L of the element 2. The element 30 can thus surround the element 2 transversely to the longitudinal direction L. A connecting section 33 may be disposed between the element 2 and the element 30, which in conjunction with the element 30 can at least partially or even completely surround the element 2. The connecting section 33 may be formed as a hollow cylinder, in particular a straight hollow cylinder, whose longitudinal axis extends parallel to the longitudinal direction L.

The element 30 may have a length along the longitudinal direction L that is smaller than the length of the element 2. In particular, the length of the element 30 may correspond to a fraction of the length of the element 2 and, for example, one third of the length of the element 2. The element 30 may be formed as a straight hollow cylinder, such as a pipe section.

FIG. 14 shows another exemplary embodiment of the sonotrode 1 according to the invention in a side view sectioned along the longitudinal direction L. The same reference symbols are used for elements that correspond in function and/or construction to the elements of the exemplary embodiments of the previous figures. For sake of brevity, only the differences from the exemplary embodiment of FIG. 7 are discussed below.

FIG. 14 shows the sonotrode 1 with yet another element 34 that is arranged along the longitudinal direction L behind the element 3. The element 34 contacts a side 15 of the element 3, wherein a side of the element 24 facing the side 15 is preferably formed substantially complementary to the side 15. A side 35 of the element 34 facing away from the element 3 may, like the side 15, be shaped hemispherically or may at least have a semi-circular cross-section. The element 34 may have a crescent-shaped cross-section transversely to the longitudinal direction L.

The two elements 3, 34 can also be materially interconnected, wherein a separate connecting section that materially connects the elements 3, 34 is not shown for sake of clarity.

FIG. 15 shows an apparatus 40 for generating low-frequency high-power ultrasound, with a sonotrode 1 and a low-frequency high-power ultrasonic generator 41. The low-frequency high-power ultrasonic generator 41 is coupled with the sonotrode 1 and example with its element 2 for transmission of ultrasound. The sonotrode 1 is a sonotrode 1 according to the invention and, for example, a sonotrode 1 according to one of the exemplary embodiments of FIGS. 1 to 14.

In all the described exemplary embodiments, the last element of the sonotrode 1 in the longitudinal direction L may be made of the same material or of a different material as at least one of the other elements of the sonotrode. In particular, the last element in the longitudinal direction L may be made of a glass or ceramic material, or may even have a body made of the glass or ceramic material. To produce the material connection, in particular when the material connection is provided by a metal solder joint or welded joint, the last element may be provided with a metallic layer that takes part in the material connection. Alternatively, the ceramic material itself may be solderable or when the element is made of the glass material, the material connection may be produced by a glass solder.

LIST OF REFERENCE SYMBOLS 1 sonotrode
2, 3 element
4 connecting section
5 element
6 connecting section
7 flat side
8 apex or edge
9 side
10, 11 transition area
12, 13 lateral side
14, 15 side
16, 17 lateral side
18 element
19, 20 end face
21 connecting section
22, 22a opening
23 element
24 connecting section
25 end section
26 bolt
27 element
28 element
29 connecting section
30 element
31 end section
32 center section
33 connecting section
34 element
35 facing-away side
40 apparatus
41 low-frequency high-power ultrasonic generator
H main propagation direction
L longitudinal direction

The invention claimed is:

1. A sonotrode for transmitting of low-frequency high-power ultrasound, for an apparatus for generating low-frequency high-power ultrasound, wherein the sonotrode comprises several elements, characterized in that:
   at least two of the plurality of elements are materially interconnected; and
   at least one of the materially interconnected elements is a lambda/2 element of the sonotrode.

2. The sonotrode according to claim 1, characterized in that one of the materially interconnected elements is made of a material that is different from a material of another of the materially interconnected elements.

3. The sonotrode according to claim 1, characterized in that at least one of the materially interconnected elements is made of a ceramic material.

4. The sonotrode according to claim 1, characterized in that at least one of the materially interconnected elements is a hollow body.

5. The sonotrode according to claim 1, characterized in that at least one of the materially interconnected elements is a cylindrical body.

6. The sonotrode according to claim 1, characterized in that at least one of the materially interconnected elements is a pipe segment.

7. The sonotrode according to claim 1, characterized in that at least one of the materially interconnected elements is designed so that a fluid can flow through.

8. A sonotrode for transmitting of low-frequency high-power ultrasound, for an apparatus for generating low-frequency high-power ultrasound, wherein the sonotrode comprises several elements, characterized in that:
   at least two of the plurality of elements are materially interconnected;
   the sonotrode is designed with a predefined main propagation direction for low-frequency high-power ultrasound; and
   a connecting section materially interconnecting the elements is oriented perpendicular to the main propagation direction.

9. A sonotrode for transmitting of low-frequency high-power ultrasound, for an apparatus for generating low-frequency high-power ultrasound, wherein the sonotrode comprises several elements, characterized in that:
   at least two of the plurality of elements are materially interconnected;
   the at least two materially interconnected elements are materially interconnected by a connecting section of the sonotrode, wherein the connecting section is flat, annular or shaped as a hollow cylinder;
   the flat or annular connecting section is oriented perpendicular to the main propagation direction; and
   the hollow-cylindrical connecting section is oriented along the main propagation direction.

10. An apparatus for generating low-frequency high-power ultrasound, with a sonotrode, characterized in that the sonotrode comprises a sonotrode according to claim 1.

11. The apparatus according to claim 10, characterized in that the apparatus generates during operation low-frequency high-power ultrasound as a standing wave in the sonotrode, and that the connecting section is spaced from an oscillation node.

* * * * *